MEANS FOR CORRECTING BAD MEMORY BITS BY BIT ADDRESS STORAGE

Filed Dec. 24, 1963

INVENTOR
F. E. SAKALAY

BY Sughrue, Rothwell, Mion & Zinn
ATTORNEYS

United States Patent Office 3,245,049

Patented Apr. 5, 1966

3,245,049

MEANS FOR CORRECTING BAD MEMORY BITS BY BIT ADDRESS STORAGE

Fred E. Sakalay, Poughkeepsie, N.Y., assignor to International Business Machines Corporation, New York, N.Y., a corporation of New York Filed Dec. 24, 1963, Ser. No. 333,152

4 Claims. (Cl. 340—172.5)

This invention relates to a defective memory and more particularly to a core memory having multi-bit words stored at discrete selectable addresses therein, each bit position of each of said words being identified by a single two-state core, some of which cores exhibit two remanence states and others exhibiting only one.

For the purposes of this specification and the accompanying claims, the following definitions will be used:

Good core—A two-state core which upon appropriate application of switching current thereto is switchable between its two remanent states.

Bad core—A two-state core which while switchable into its two states exhibits remanence in only one of said states.

Good word—A word in which all cores identifying the bit positions thereof are good cores.

Bad word—A word in which at least one of the cores identifying a bit position therein is a bad core.

Bad word address—The address in memory of a word location containing a bad core.

Good word address—The address in memory of a word location containing all good cores.

Bad bit address—The address in a given word of a bad bit due to a bad core.

In general, it may be said that a core may be bad because it is either broken or it is non-square loop. For the purposes of this specification, it will be assumed hereinafter that a broken core will be used only to store a zero and non-square loop core to store only a 1. Prior testing of a fabricated core array locates the bad word addresses in the array and the bad core location in each bad word address.

Although this present invention is applicable to two or three dimensional core memories, for illustration purposes, three dimensional memories will be emphasized. A three-dimensional core memory addressable by X and Y coordinate switching currents in any conventional fashion. A memory address register may contain the address of a word to be selected, which address is converted into X and Y coordinates to select a particular multi-bit word in the memory. Upon the application of the X and Y switching currents to the array, the selected word is read out from memory and the bits thereof appear on associated sense lines. In accordance with this invention an auxiliary memory is provided which may be of the type known in the art as a read-out memory. Assume that at address A in main memory a five bit word plus parity bit is stored and that bit position 4 is a bad bit, that is, the core assigned to store said bit is bad. When main memory is accessed at address A, means are provided to simultaneously address the auxiliary memory with address A′. The latter is accomplished by a manual selection panel and decode driver whereby address A is converted to address A′ for auxiliary memory at which address a 4 is stored. Upon readout from auxiliary memory of this 4 responsive to the simultaneous addressing of main memory and auxiliary memory, the bad word containing the bad 4 bit is read out to an output register. Said bad bit may or may not be inverted depending upon a parity check. If the parity check indicates an error then inversion of bit 4 is provided. If the parity check indicates no error then bit 4 is not inverted. This particular system can accommodate one bad bit per parity bit.

It is, therefore, one object of the present invention to provide a bad bit memory system for correcting one bad bit per parity bit.

It is a more specific object of this invention to provide such a system wherein a bad bit in a word read out from main memory may be located and corrected responsive to a parity check of said word.

It is a further object of this invention to store bad bit addresses in an auxiliary memory in such a fashion that they are coordinated with bad word addresses in main memory whereby upon read out from main memory of a bad word, auxiliary memory indicates the bad bit address in said bad word and responsive to a parity check of said bad word correction may be made to that bad bit identified by auxiliary memory.

In general the invention is accomplished by providing a bad bit memory system comprising a memory for storing multi-bit good and bad words at discrete selectable addresses therein, means to address said memory to read out therefrom a bad word, means to determine the bad bit location in said bad word, means to check the parity of said bad word, and means responsive to a lack of parity to correct said bad bit.

These and other objects will become apparent from a more detailed description of the accompanying figures.

Figure 1:
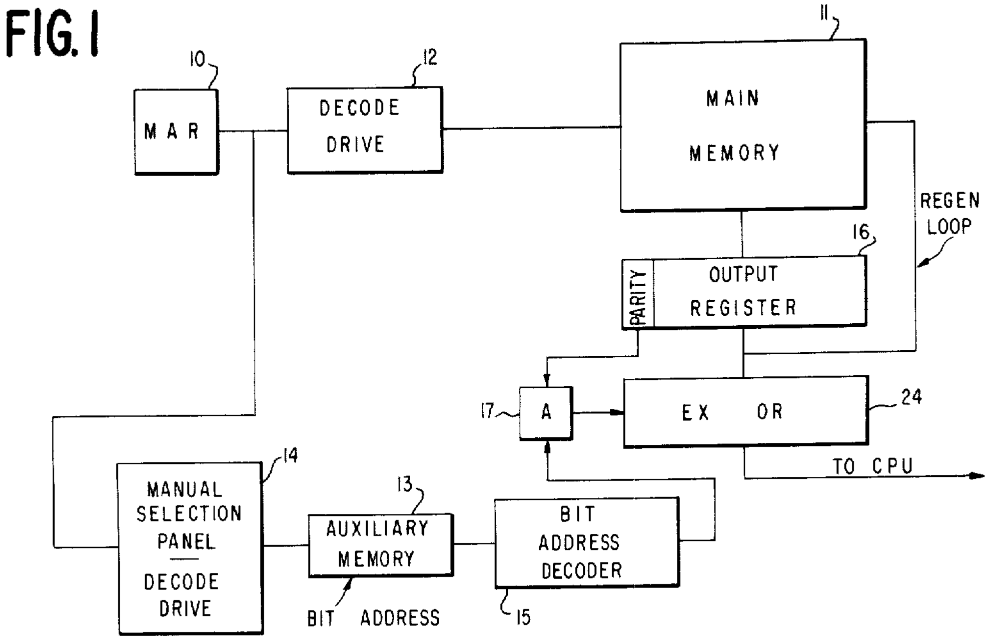
FIGURE 1 is a diagrammatic illustration of one system that may be employed in accordance with this invention.

Referring first to FIGURE 1 the memory address register 10 identified in this figure as MAR is a conventional memory address register which may store the address of a word to be read out of main memory 11. Interposed between the memory address register 10 and the main memory 11 is the decode driver 12 which decodes the address contained in the register 10 to provide coordinate switching currents to the selected address of a word to be read out from a memory 11. All of the units 10, 11, and 12 and the means of employing them are conventional and do not per se form a part of this invention.

Simultaneously with the addressing of main memory from the memory address register, the auxiliary memory 13 is addressed. This auxiliary memory 13 may be of the type known in the art as a read only memory. Interposed between the memory address register 10 and the auxiliary memory 13 is a manual selection panel and decode driver 14. This unit 14 is conventional and does not per se form a part of this invention. It functions as follows: A manual selection panel is provided which is so wired that when a bad word address is stored in register 10 the manual selection panel will convert this particular address into an address useable by the decode drive portion to provide a bit address to auxiliary memory 13. In other words let it be assumed that at address A in main memory a bad word is stored in which bit 4 is a bad bit. When address A is provided to the unit 14 this unit will convert address A to address A′ which is an address in auxiliary memory wherein a binary 4 may be stored. The binary 4 is read out of the auxiliary memory 13 and is sent to the bit address decoder 15. The bit address decoder 15 may have at the output thereof a number of output lines equal to the number of data bits in the word read out from main memory to the output register 16. If a good word address is stored in register 10, the unit 14 ignores this good address since it is not wired to handle good word addresses. Consequently no output will be received from bit address decoder under this circumstance.

The addressed word in memory is read out into output register 16. A parity check is run on this word and assuming that the word is a good word it is subsequently under the influence of a clock pulse gated through EX OR (exclusive OR) gates 24 to CPU. If it is a bad word then the results of a parity check together with the output from the bit address decoder 15 will cooperate to invert the bad bit in said bad word identified by decoder 15 or not depending upon the character of the parity check. Diagrammatically in this figure the AND gate 17 illustrates the cooperation between the parity check and the output of the decoder 15. For a more detailed description of how this cooperation takes place reference is now made to FIGURE 2.

Assuming even parity, that is the character of the parity bit in output register 16 is such as to provide an even number of ones therein, then by virtue of the tree of exclusive OR gates as shown, the output from exclusive OR gate 18 will be plus if the check reveals a lack of parity and a minus if the check reveals parity. A plus is equated to a 1 bit and a minus to a zero bit. Let us assume that there is a lack of parity and that the output from the exclusive OR gate 18 is plus. Let us further assume that bit B4 is a bad bit and is zero instead of a one. To show how the zero is inverted into a one by EX OR 24, reference is now made to FIGURE 3.

EX OR 24 is comprised of a plurality of individual EX OR gates 22, 23, etc. Since the parity check indicates a lack of parity, output line 19 which is actually the output line from exclusive OR gate 18 is at a plus value conditioning gates 20 and 21. There are a number of these AND gates 20 and 21 equal to the number of data bits in the word read out of memory. The lines $B_3$ and $B_4$ come from the bit address decoder 15. Since in this case we have assumed that bit 4 is bad then line $B_4$ is at a plus value. This then provides a plus output from AND gate 20 only to the exclusive OR gate 22. Since the value of bit 4 is zero the output of exclusive OR gate to the $B_4$ position in output register 24 will be a 1. Consequently $B_4$ which is a zero in output register 18 will be corrected to a 1. Since the output from AND gate 21 is a zero due to the fact that line $B_3$ from the decoder 15 is zero, then the output from exclusive OR gate 23 will be the same as the input thereto. Consequently $B_3$ in output register 16 will not be inverted.

Figures 2, 3:
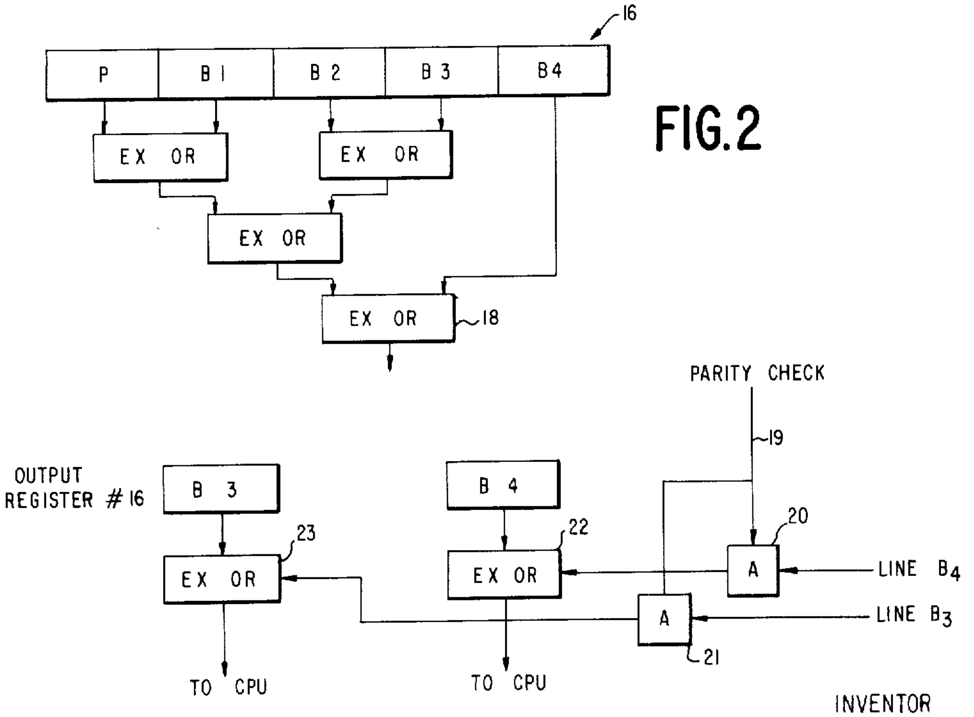
FIGURE 2 is a diagrammatic illustration of one form of parity checking scheme that may be employed; and, FIGURE 3 is a diagrammatic representation of one form of bit correction scheme that may be employed in accordance with the present invention.

It should be noted that the particular type of parity check shown in FIGURE 2 is not per se a part of the present invention. Other parity checking means may be employed. Additionally, the transfer between output register 16 and EX OR 24 as shown in FIGURE 3 is also not per se part of the present invention. Other means obvious to those skilled in the art may be employed to invert or not invert during said transfer. It should also be noted that in connection with FIGURE 1, a regeneration loop may be provided in any conventional fashion whereby the contents of output register 16 may be regenerated back into main memory 11.

What has been described is one embodiment of the present invention. Other embodiments obvious from the teachings herein to those skilled in the art are contemplated to be within the spirit of the scope of the following claims.

What is claimed is:

1. A bad bit memory system comprising a memory for storing multi-bit words at discrete selectable addresses therein some of said words being bad words and some of said words being good words, means for selecting a word from said memory, means for detecting a bad word when so selected, means responsive to the selection of a bad word for identifying the location of a bad bit therein, means to check the parity of said bad word and means responsive to a lack of parity to correct said bad bit at the identified location thereof.

2. A bad bit memory system comprising a main memory for storing multi-bit words at discrete selectable addresses therein, some of said words being bad words and some of said words being good words, means for selecting a word from said main memory, an auxiliary memory for storing at discrete selectable addresses therein the location of a bad bit associated with each bad word in said main memory, means to detect a bad word when so selected, means to select from said auxiliary memory the bad bit location in said bad word, means to check the parity of said bad word, means responsive to a lack of parity in said bad word to correct the bad bit therein as determined by said selected bad bit location.

3. A bad bit memory system comprising a main memory for storing multi-bit words at discrete selectable addresses therein, some of said words being bad words containing a bad bit at a bit address therein, an auxiliary memory for storing at discrete selectable addresses therein the bad bit location in each of said bad words, means to address said main memory to read out thereof an addressed word, means to detect a bad word when so addressed, means responsive to the addressing in main memory of a bad word to simultaneously address said auxiliary memory with said bad word address, means to convert said bad word address into an address in said auxiliary memory wherein is stored the bad bit location in said bad word, means responsive to said auxiliary memory addressing to indicate said bad bit location, means to check the parity of said bad word and means responsive to a lack of parity to correct said bad bit at the location identified by said bad bit location.

4. A bad bit memory system as claimed in claim 3, wherein said auxiliary memory is a read-only memory.

No references cited.

ROBERT C. BAILEY, *Primary Examiner.*

P. J. HENON, *Assistant Examiner.*